(12) United States Patent
Xu et al.

(10) Patent No.: US 8,291,417 B2
(45) Date of Patent: Oct. 16, 2012

(54) TRACE BUFFER WITH A PROCESSOR

(75) Inventors: Kun Xu, Austin, TX (US); Jen-Tien Yen, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1394 days.

(21) Appl. No.: 11/530,051

(22) Filed: Sep. 8, 2006

(65) Prior Publication Data

US 2008/0127187 A1    May 29, 2008

(51) Int. Cl.
*G06F 9/46* (2006.01)
*G06F 11/00* (2006.01)
*G06F 3/00* (2006.01)

(52) U.S. Cl. ............... 718/100; 710/56; 714/30; 714/45

(58) Field of Classification Search ......................... None
See application file for complete search history.

(56) References Cited

U.S. PATENT DOCUMENTS

| | | | |
|---|---|---|---|
| 5,901,277 A * | 5/1999 | Chu et al. .................. | 358/1.15 |
| 6,269,117 B1 * | 7/2001 | Peng ........................ | 375/232 |
| 6,546,465 B1 * | 4/2003 | Bertone .................... | 711/144 |
| 6,567,932 B2 * | 5/2003 | Edwards et al. ........... | 714/30 |
| 6,615,370 B1 * | 9/2003 | Edwards et al. ........... | 714/45 |
| 6,622,218 B2 * | 9/2003 | Gharachorloo et al. .... | 711/141 |
| 6,658,519 B1 | 12/2003 | Broberg, III et al. | |
| 6,728,906 B1 * | 4/2004 | Case et al. ................ | 714/45 |
| 6,862,673 B2 * | 3/2005 | Lee et al. .................. | 711/169 |
| 6,918,065 B1 | 7/2005 | Edwards et al. | |
| 2001/0037443 A1 * | 11/2001 | Liu .......................... | 712/200 |
| 2003/0145255 A1 * | 7/2003 | Harty et al. ............... | 714/48 |
| 2003/0229823 A1 | 12/2003 | Swaine et al. | |
| 2004/0117487 A1 | 6/2004 | Swoboda | |
| 2004/0117605 A1 | 6/2004 | Ahmad et al. | |
| 2004/0243894 A1 * | 12/2004 | Smith et al. .............. | 714/724 |
| 2004/0250164 A1 * | 12/2004 | Ahmad et al. ............ | 714/30 |

OTHER PUBLICATIONS

Helms et al; "Event Monitoring in a System-on-a-Chip"; IBM J. Research Development 43, No. 5/6, Germany, 1999.
Motorola, Inc. "JTAG and Enhanced On-Chip Emulation (Enhanced OnCE)" pp. 11-9 thru 11-11, Dec. 2001.
Freescale Semiconductor, Inc. "MPC8548E PowerQUICC III Integrated Host Processor Reference Manual" pp. 20-1 to 20-22, Mar. 2006.
International Search Report for correlating PCT Patent Application No. PCT/US 07/69920 dated Mar. 12, 2008.

* cited by examiner

*Primary Examiner* — Meng An
*Assistant Examiner* — Abdullah Al Kawsar
(74) *Attorney, Agent, or Firm* — James L. Clingan, Jr.; Joanna G. Chiu; Jonathan N. Geld

(57) ABSTRACT

A method includes storing a first transaction entry to a first software configurable storage location, storing a second transaction entry to a second software configurable storage location, determining that a first transaction indicated by the first transaction entry has occurred, determining that a second transaction indicated by the second transaction entry has occurred subsequent to the first transaction, and, in response to determining that the first transaction occurred and the second transaction occurred, storing at least one transaction attribute captured during at least one clock cycle subsequent to the second transaction. The first and second software configurable storage locations may be located in a trace buffer, where the at least one transaction attribute is stored to the trace buffer and overwrites the first and second transaction attributes. Each transaction entry may include a dead cycle field, a consecutive transaction requirement field, and a last entry field.

18 Claims, 4 Drawing Sheets

TRACE BUFFER WITH A PROCESSOR

FIELD OF THE INVENTION

This invention relates to system on a chip (SOC) type integrated circuit, and more particularly, to such an integrated circuit having a trace buffer.

BACKGROUND OF THE INVENTION

As integrated circuits have been able to have more and more transistors, a continuing trend has been to have more and more functions on a particular integrated circuit. This has been generally called a system on a chip (SOC). A common characteristic of SOC type integrated circuits is one or more processors coupled to a variety of functional circuits through different interface buses. With the functional circuits on the integrated circuit, it is often more efficient to design the integrated circuit in such a way that results in not having access to the internal buses from outside the integrated circuit. Without access to the internal buses, it can be difficult to debug the integrated circuit during qualification of the product.

To help this, trace buffers have been developed to provide certain internal bus information under certain conditions. This has been helpful but the information has been limited and certainly less complete than having direct access to the internal bus.

Thus, there is a need to have better information about the bus in a SOC type integrated circuit.

BRIEF DESCRIPTION OF THE DRAWINGS

The foregoing and further and more specific objects and advantages of the invention will become readily apparent to those skilled in the art from the following detailed description of a preferred embodiment thereof taken in conjunction with the following drawings.

DETAILED DESCRIPTION OF THE INVENTION

In one aspect a circuit has a processor and a trace circuit in which the trace circuit is software configurable so that a wide variety of options are available to be checked. This is highly beneficial because the particular combination that may be under consideration can be monitored for proper operation. This is better understood by reference to the drawings and the following description.

Figure 1:
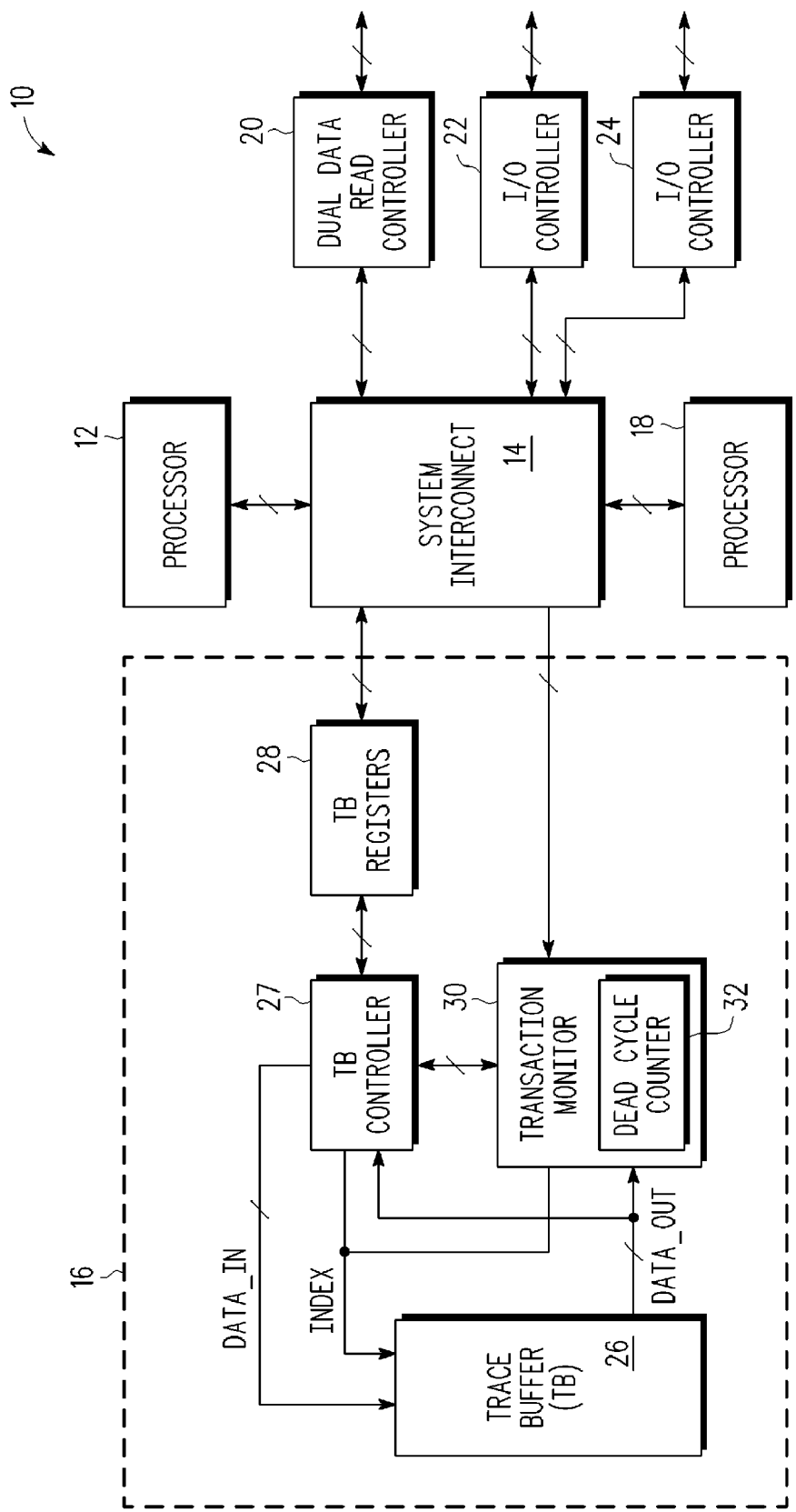
FIG. 1 is an circuit according to an embodiment of the invention.

Shown in FIG. 1 is a system on a chip (SOC) type integrated circuit 10 comprising a processor 12, a system interconnect 14 coupled to processor 12, a trace circuit 16 coupled to system interconnect 14, a processor 18 coupled to system interconnect 14, a dual data read controller 20 coupled to system interconnect 14 and having an external interface from integrated circuit 10, and an I/O controller 22 coupled to system interconnect 14 and having an external interface from integrated circuit 10. Trace circuit 16 comprises a trace buffer 26, a trace buffer controller 27 coupled to trace buffer 26, trace buffer registers 28 coupled to trace buffer controller 27 and system interconnect 14, and a transaction monitor 30 coupled to trace buffer 26, trace buffer controller 27, and system interconnect 14. Integrated circuit 10 is a multi-processor system with additional masters such as dual data read controller 20 as well as I/O controllers 22 and 24. Transaction monitor 30 contains a dead cycle counter 32. It is understood that other additional functions that are not shown in FIG. 1, a cache for example, may be included in integrated circuit 10.

System interconnect 14 has the main data and address buses as well as the necessary circuitry to control access to these internal buses. An arbitration unit, for example, is included in system interconnect 14. Trace buffer 26 may conveniently be a static random access memory (SRAM). Trace circuit 16 is used to determine when a particular transaction or series of transactions has occurred in system interconnect 14 based on the contents of trace buffer 26. When this occurs it is called a match. Trace buffer 26 is software configurable to contain a wide variety of conditions for monitoring system interconnect by transaction monitor 30. Trace buffer 26 is loaded through trace buffer registers 28 and trace buffer controller 27 with a plurality of entries. In this example the entries are 64 bits in length and there is a possible number of 256 entries. Thus, there are up to 256 transactions that can be monitored in order to receive a complete match. In operation, an entry is loaded into trace buffer 26 corresponding to each transaction that is to be monitored. Transaction monitor determines if there is a match on each clock cycle of system interconnect 14. If there is a match, then a transaction match has occurred and the next entry is then used by transaction monitor to monitor the next clock cycle. As transaction matches continue, then the trace monitor continues to provide new entries which can be up to the memory capacity which in this example is 256. Once all of the entries that are desired to be monitored have been used and there is a transaction match on the last one, there is then a complete match. Recording of conditions occurring after the complete match then may proceed.

Figure 2:
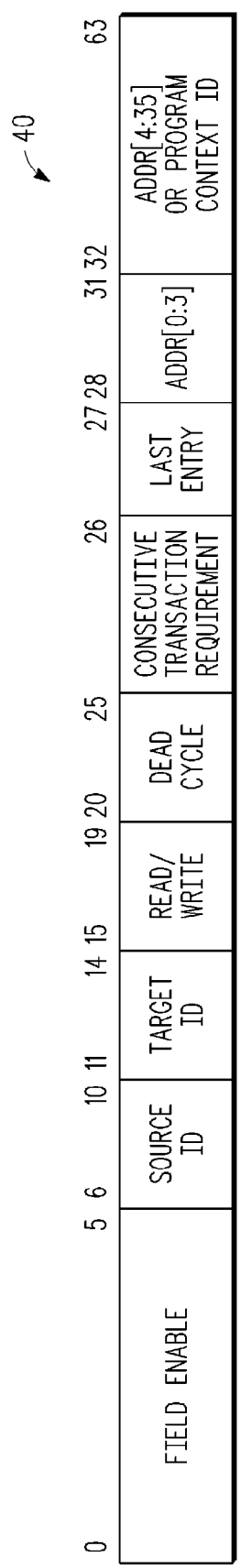
FIG. 2 is a structure and a 64-bit entry structure useful in the circuit of FIG. 1.

Shown in FIG. 2 is a configuration diagram of an entry 40 used by trace buffer 26 and the code for use by transaction monitor to enable proper monitoring and determining of a transaction match. Entry 40 uses the first 6 bits, 0-5, to provide the information which subsequent fields are to be monitored for a match. The next 5 bits, 6-10 are for pointing out the source of the particular clock cycle. For example, processors 12 and 18 and controllers 20, 22, and 24 are possible sources that may be identified by these 5 bits. The next 4 bits, 11-14, identify the target. The next 5 bits, 15-19, identify the type of read or write. There are many different kinds of reads and writes, especially as they relate to a cache. Examples include write with flush, read with cache allocate, and read with no intent to cache. The next 6 bits are for providing how many dead cycles between transactions being monitored. The next bit, 26, is for identifying there is a consecutive requirement that is being required. To fulfill the consecutive requirement if that is selected at bit 26, the next valid transaction must match the requirements. If the consecutive requirement is not selected, a transaction match can occur even with intervening valid transactions that are not a match. The next bit, 27, is to identify if it is the last entry for determining a complete match. The number of entries can be anywhere from 1 to 128 in this example. The last entry will be identified at bit 27. The next 4 bits, 28-31, are for the first four bits of a normal address, which is 36 bits. The final 32 bits are for the last 32 bits of the normal 36 bit address or for all of the bits of a program context ID, which is 32 bits. Any of the bits of address in any combination can be masked by trace controller 26. Masking, however, is for all of the entries in trace buffer 26.

In operation, an entry or plurality of entries up to 256 are made in trace buffer 26. For a transaction match, transaction monitor 30 identifies what is to be monitored as identified in the first entry and ultimately provides a complete match indicator after all entries have been matched. For a particular transaction match, transaction monitor receives the required information from trace buffer 26. The field enable portion of entry 40, the entry corresponding to the next clock cycle to be monitored, identifies which part of the bus is to be monitored for a transaction match. For example, it may not matter what the target is. In such case the source, the type of read/write, the dead cycle requirement, the consecutive transaction requirement, and address must be met in order for there to be a transaction match.

Figure 3:
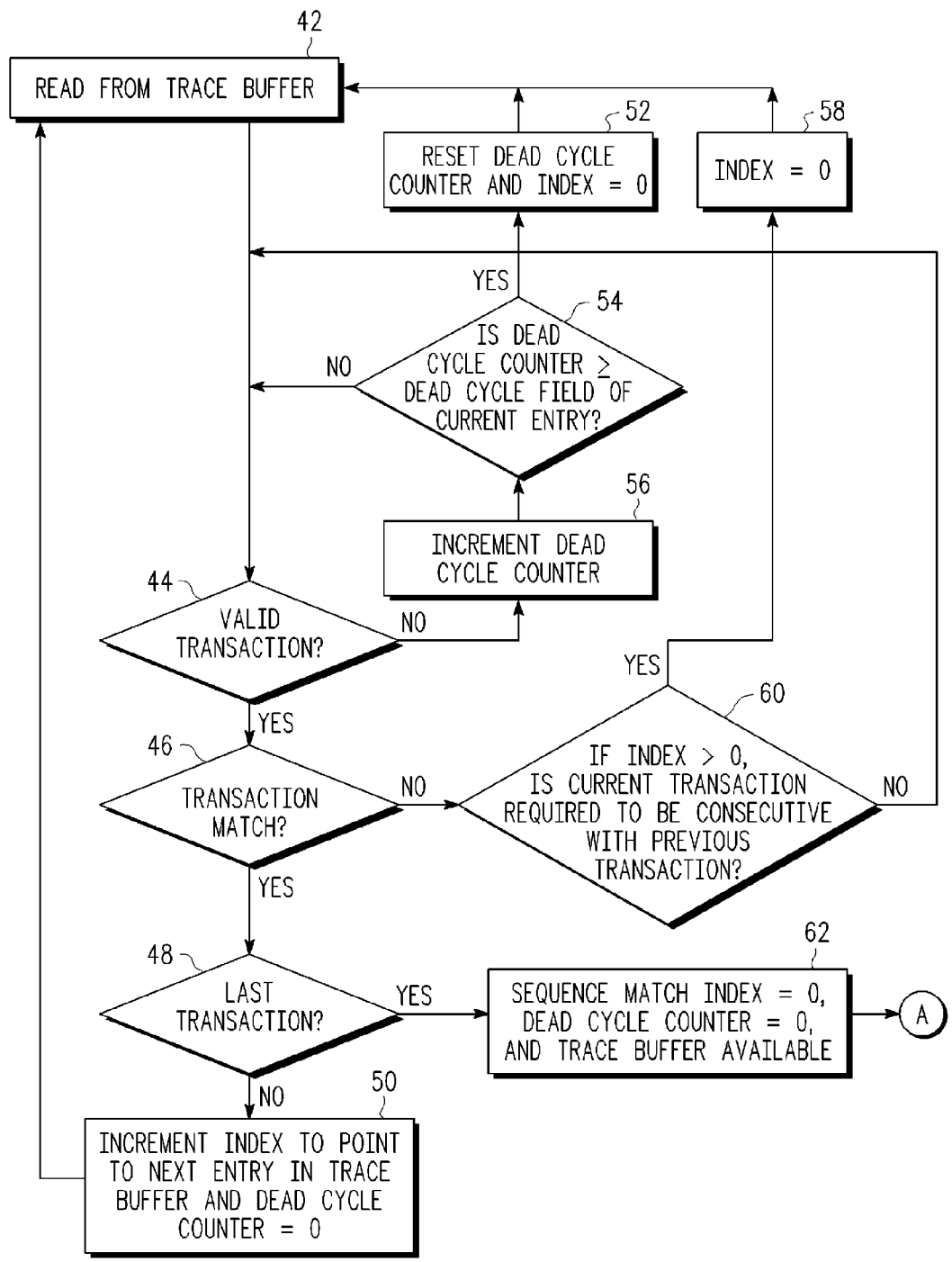
FIG. 3 is a flow diagram of a method of operating the circuit of FIG. 1.

A method of determining a complete match is shown in FIG. 3. Trace buffer 26 is first loaded with the entries that define the sequence of transactions to be monitored. This is achieved under the direction of one of the masters and through system interconnect 14, trace buffer registers 28, and transaction buffer controller 26. Transaction buffer controller provides the data-in and the index to trace buffer 26 to achieve the loading of trace buffer 26 with the sequence of transactions.

After loading trace buffer 26, the first entry is received by transaction monitor 30 which then interprets the entry as indicated for entry 40 and monitors system interconnect 14 accordingly shown as step 42. In step 44, transaction monitor 30 determines if the transaction is valid. If so, in step 46, transaction monitor determines if there is a transaction match. If so, in step 48, transaction monitor 30 determines if it is the last transaction. If no, in step 50, then transaction monitor 30 increments the index for trace buffer 26 to point to the next entry in trace buffer 26 and sets dead cycle counter 32 to zero and the process continues again with step 42. If instead of the transaction being valid at step 44, it is not valid, then dead cycle counter 32 is incremented as shown in step 56. If the dead cycle counter, after incrementing at step 56, is greater than the dead cycle field of the current entry, then transaction monitor 30 sets the index to zero and resets the dead cycle counter to zero as shown at step 54. If, at step 46, there is no transaction match, then at step 60, there is decision based on the consecutive requirement. If the index is greater than zero, then there is a determination as to whether the current transaction is required to be consecutive with the previous transaction. If yes, then index is set to zero. If no, then step 44 is the next step as applied to the next clock cycle. In step 48, after a transaction match has been determined in step 46, then the next step, step 62, is for transaction monitor 30 to provide an indication that there is a complete match for the sequence of entries, set the index to zero, and set the dead cycle counter to zero. At this point trace buffer 26 is available to be overwritten with transactions that need to be recorded.

Figure 4:
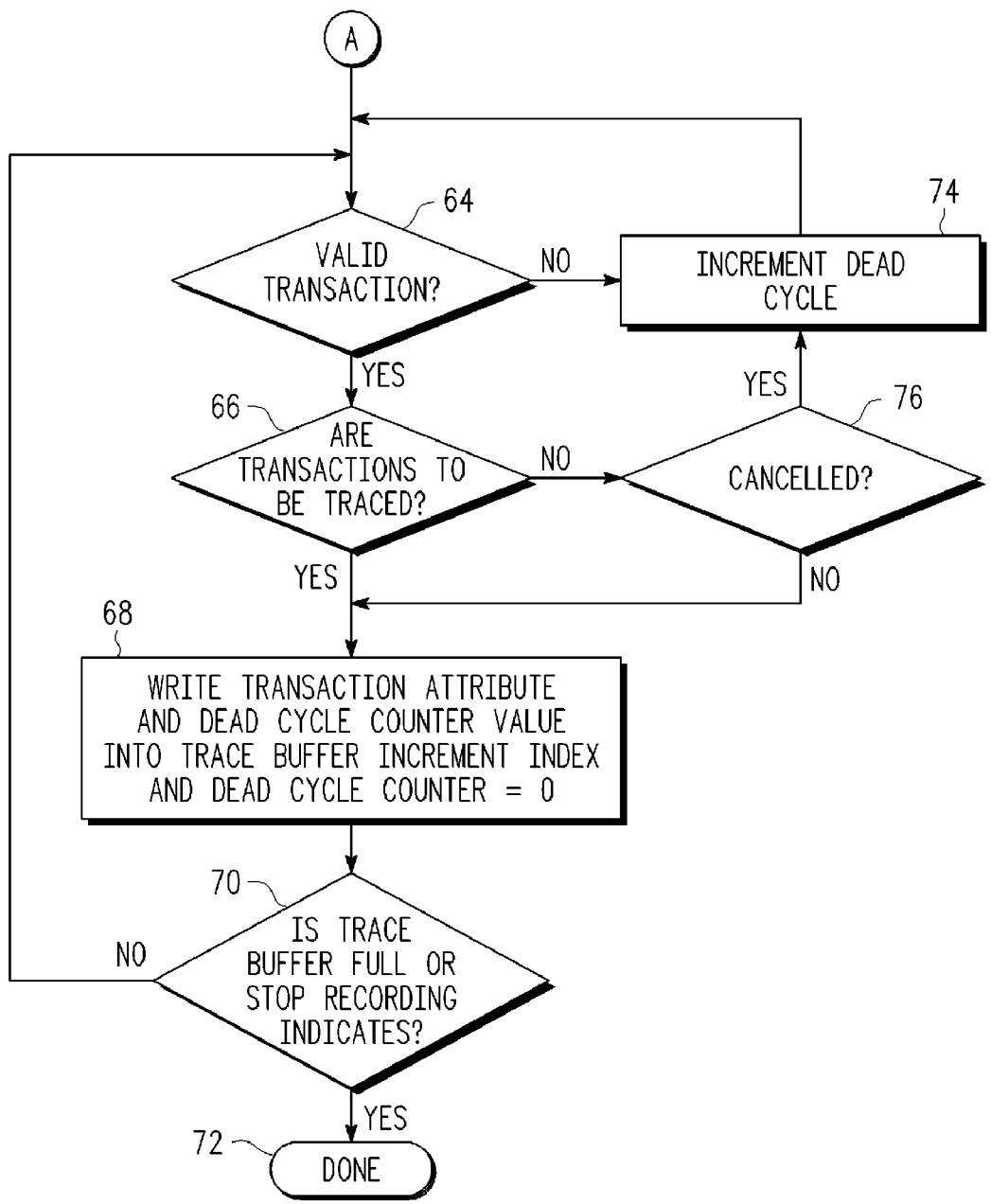
FIG. 4 is a flow diagram of an extension of the method of FIG. 3.

Shown in FIG. 4 is the continuation of FIG. 3 to FIG. 4. After step 62 of FIG. 3, which indicates a complete match A, then from A in FIG. 4, recording begins. In the first step, step 64, transaction monitor determines if the transaction is valid in the clock cycle following the determination of the complete match. If yes, transaction buffer controller 26, in step 66, identifies if the canceled transactions are to be traced into trace buffer 26. This decision is based on information loaded into trace buffer registers 28. If yes at step 66, then trace buffer controller 27 writes the transaction attributes and the dead cycle counter value into trace buffer 26. Exemplary transaction attributes are source ID, target ID, and transaction type. The transaction can be either a data or an address transaction. This determination as to which particular transaction type is to be loaded into trace buffer 26 is based on information that is loaded into trace buffer registers 28. If yes at step 66, trace buffer controller 27 also increments the index and sets dead cycle counter 32 to zero. Then at step 70, there is a determination by trace buffer controller 27 if trace buffer 26 is full or if there is an indication to stop recording stored in trace buffers 28. If yes to either, then recording is complete as shown in step 72. If not, then the next clock cycle is monitored in the same beginning with step 64. If at step 64 the current transaction being monitored by transaction monitor 30 is not valid, then the dead cycle is incremented and the next step is step 64. If at step 66 trace buffer controller 27 determines that canceled transactions are not to be traced, then at step 76 trace buffer controller 27 determines if the transaction is to be cancelled. If no, then the action of recording as described for step 68 commences. If yes, then the dead cycle counter is incremented as shown in step 74 then the next clock cycle is monitored as shown commencing with step 64.

These methods of FIGS. 3 and 4 are shown as looping back so that there may be many cycles before a complete match or even a transaction match is achieved. In the case of recording, one transaction attribute is recorded followed by subsequent recordals of transaction attributes. Similarly, an event match is followed by subsequent event matches. These multiple matches and multiple recordals can be up to the available memory amount for trace buffer 26.

Thus, trace buffer 26 is used not only for recording transaction attributes but also for storing the sequence of transactions that are to be monitored in system interconnect 14. Trace buffer 26, being software configurable, provides for great flexibility in determining which transactions are monitored. The entry of the transactions being in a 64 bit entry provides for a wide variety of choices utilizing the field enable feature to identify what in particular is to be monitored.

Various other changes and modifications to the embodiments herein chosen for purposes of illustration will readily occur to those skilled in the art. For example, the number of bits of an individual entry, which was described as 64, as well as the number of entries, which was described as 256, in trace buffer 26 can vary. The trace buffer was described as a SRAM but another memory type may be effective. Examples were described to aid in understanding. It was not intended that these examples were the only examples. To the extent that such modifications and variations do not depart from the spirit of the invention, they are intended to be included within the scope thereof which is assessed only by a fair interpretation of the following claims.

The invention claimed is:

1. A method, comprising:
   storing a first transaction entry to a first software configurable storage location, wherein the first transaction entry is selected from a plurality of transaction entries and the first software configurable storage location is a first location in a random access memory;
   storing a second transaction entry to a second software configurable storage location, wherein the second transaction entry is selected from the plurality of transaction entries and the second software configurable storage location is a second location in the random access memory;
   determining that a first transaction indicated by the first transaction entry has occurred;
   determining that a second transaction indicated by the second transaction entry has occurred subsequent to the first transaction, wherein the first and second transaction entries comprise one or more of a last entry field, a consecutive transaction requirement field, and a dead cycle field, and the dead cycle field indicates a number of dead cycles required between the first transaction and the second transaction; and in response to determining that the first transaction occurred and the second transaction occurred, storing at least one transaction attribute captured during at least one clock cycle subsequent to the second transaction to at least the first software configurable storage location to overwrite the first transaction entry, wherein the at least one transaction attribute does not comprise any of a last entry field, a consecutive transaction requirement field and a dead cycle field.

2. The method of claim 1, wherein the first transaction entry comprises a last entry field to indicate whether the first transaction entry is a last entry of a sequence of entries and the second transaction entry comprises a last entry field to indicate whether the second transaction entry is a last entry of a sequence of entries.

3. The method of claim 2, wherein the last entry field of the second transaction entry indicates that the second transaction entry is a last entry of a sequence of entries comprising the first transaction entry and the second transaction entry.

4. The method of claim 1, wherein the first transaction entry comprises a consecutive transaction requirement field which indicates that the second transaction is required to be consecutive to the first transaction, and wherein determining that the second transaction has occurred comprises determining that the second transaction has occurred consecutive to the first transaction, without any intervening valid transactions.

5. The method of claim 1, further comprising:
prior to determining that the second transaction has occurred, counting a number of clock cycles without a valid transaction which occur after the first transaction.

6. The method of claim 5, wherein the second transaction entry comprises a dead cycle field which indicates a number of dead cycles required between the first transaction and the second transaction, wherein determining that the second transaction has occurred comprises determining that the number of clock cycles without valid transactions matches the number of dead cycles indicated by the dead cycle field.

7. The method of claim 1, wherein storing the at least one transaction attribute captured during the at least one clock cycle subsequent to the second transaction comprises storing a second transaction attribute to the second software configurable storage location to overwrite the second transaction entry, wherein the second transaction attribute is captured during a later clock cycle that the first transaction attribute.

8. The method of claim 1, wherein storing the at least one transaction attribute captured during the at least one clock cycle subsequent to the second transaction comprises storing a dead cycle counter value captured during the at least one clock cycle.

9. The method of claim 1, further comprising:
prior to determining that the first transaction indicated by the first transaction entry has occurred, storing a third transaction entry to a third software configurable storage location is a third location in the random access memory; and
determining that a third transaction indicated by the third transaction entry has occurred, wherein the third transaction occurs subsequent to the first transaction and prior to the second transaction;

wherein storing the at least one transaction attribute captured during the at least one clock cycle subsequent to the second transaction is performed in response to determining that the first transaction, the third transaction, and the second transaction have occurred.

10. A method, comprising:
storing a plurality of transaction entries to a trace buffer comprising a random access memory so that locations where the plurality of transaction entries are stored are selected by addresses, the plurality of transaction entries defining a sequence of transactions, wherein each of the plurality of transaction entries comprises one or more of a last entry field, a consecutive transaction requirement field, and a dead cycle field, and the dead cycle field indicates a number of dead cycles required between a current transaction indicated by the transaction entry and a previous transaction in the sequence of transactions;

determining that the sequence of transactions has occurred by determining that a transaction indicated by each of the plurality of transaction entries has occurred; and in response to determining that the sequence of transactions has occurred, storing a plurality of transaction attributes to the trace buffer captured during clock cycles subsequent to the sequence of transactions, wherein the plurality of transaction attributes overwrites one or more of the plurality of transaction entries corresponding to the sequence of transactions that has occurred, and the plurality of transaction attributes does not comprise any of a last entry field, a consecutive transaction requirement field, and a dead cycle field.

11. The method of claim 10 wherein the determining that the sequence of transactions has occurred comprises determining that the transaction indicated by each of the plurality of transaction entries has occurred in an order defined by the sequence of transactions.

12. The method of claim 11, wherein a last entry of the plurality of entries comprises a field to indicate that it is the last entry of the plurality of entries, the last entry indicating a last transaction in the sequence of transactions, and wherein the subsequent clock cycles occur subsequent to the last transaction.

13. The method of claim 10, wherein the plurality of transaction attributes overwrites the plurality of transaction entries in the trace buffer one transaction entry at a time, beginning from a transaction entry having the lowest address of the plurality of transaction entries.

14. The method of claim 10, wherein each transaction entry comprises a consecutive transaction requirement field which indicates that a next transaction in the sequence of transactions is required to be consecutive to a current transaction indicated by the transaction entry, without any intervening valid transactions.

15. A data processing system, comprising:
a trace buffer, the trace buffer being a random access memory storing a first transaction entry and a second transaction entry at locations selected by addresses, wherein the first and second transaction entries comprise one or more of a last entry field, a consecutive transaction requirement field, and a dead cycle field, and the dead cycle field indicates a number of dead cycles required between the first transaction and the second transaction;

a transaction monitor coupled to the trace buffer, the transaction monitor determining that a first transaction indicated by the first transaction entry has occurred and that a second transaction indicated by the second transaction entry has occurred subsequent to the first transaction; and a trace buffer controller coupled to the trace buffer and the transaction monitor, the trace buffer controller, in response to the transaction monitor determining that the first transaction and the second transaction have occurred, storing a first transaction attribute captured during a first clock cycle subsequent to the second transaction to the trace buffer, overwriting the first transaction entry, and storing a second transaction attribute captured during a second clock cycle subsequent to the first clock cycle to the trace buffer, overwriting the second transaction entry, wherein the first and second transaction attributes do not comprise any of a last entry field, a consecutive transaction requirement field, and a dead cycle field.

16. The data processing system of claim 15, wherein the second transaction entry comprises a last entry field which indicates that the second transaction entry is a last entry of a sequence of entries comprising the first and second transaction entries.

17. The data processing system of claim 15, further comprising a dead cycle counter which counts dead cycles between valid transactions, wherein the second transaction entry comprises the dead cycle field.

18. The data processing system of claim 15, wherein the first transaction entry comprises a consecutive transaction field which indicates that the second transaction is required to be consecutive to the first transaction, wherein the transaction monitor determines that the second transaction has occurred only if the second transaction occurs consecutive to the first transaction without any intervening valid transactions.

* * * * *